United States Patent
Caminschi

(10) Patent No.: US 12,277,467 B2
(45) Date of Patent: Apr. 15, 2025

(54) METHOD FOR THE IDENTIFICATION, AUTHENTICATION, AND TRACKING OF PHYSICAL ASSETS

(71) Applicant: PHYDELITER, INC., Wilmington, DE (US)

(72) Inventor: Andrew Caminschi, Bridgetown (AU)

(73) Assignee: PHYDELITER, INC., Wilmington, DE (US)

( * ) Notice: Subject to any disclaimer, the term of this patent is extended or adjusted under 35 U.S.C. 154(b) by 0 days.

(21) Appl. No.: 18/628,114

(22) Filed: Apr. 5, 2024

(65) Prior Publication Data
US 2024/0249086 A1    Jul. 25, 2024

Related U.S. Application Data

(63) Continuation of application No. PCT/US2023/010571, filed on Jan. 11, 2023.

(60) Provisional application No. 63/298,371, filed on Jan. 11, 2022.

(51) Int. Cl.
G06K 7/14 (2006.01)
G06K 5/00 (2006.01)
G06K 19/06 (2006.01)

(52) U.S. Cl.
CPC ............. G06K 5/00 (2013.01); G06K 7/1447 (2013.01); G06K 19/06037 (2013.01)

(58) Field of Classification Search
CPC ... G06K 5/00; G06K 7/1447; G06K 19/06037
USPC .................................................. 235/385, 375
See application file for complete search history.

(56) References Cited

U.S. PATENT DOCUMENTS

| | | | | |
|---|---|---|---|---|
| 6,572,025 B1* | 6/2003 | Nishikado | ........ | G06K 19/06028 235/494 |
| 6,592,033 B2* | 7/2003 | Jennings | ............ | G06Q 10/0875 235/378 |
| 7,909,248 B1* | 3/2011 | Goncalves | ........... | G07G 1/0072 235/462.14 |
| 8,196,822 B2* | 6/2012 | Goncalves | ............. | G07G 3/006 235/462.14 |
| 8,474,715 B2* | 7/2013 | Goncalves | ........... | G07G 1/0063 235/462.14 |
| 2002/0138374 A1* | 9/2002 | Jennings | ............ | G06Q 10/0875 705/29 |
| 2013/0001295 A1* | 1/2013 | Goncalves | ........... | G07G 1/0072 235/375 |
| 2018/0349695 A1* | 12/2018 | Le Henaff | ............ | G06V 10/225 |
| 2019/0012756 A1* | 1/2019 | Han | ........................ | G06Q 10/08 |
| 2021/0150690 A1* | 5/2021 | Kohlert | .................... | G06T 7/80 |

(Continued)

OTHER PUBLICATIONS

PCT International Search Report for corresponding PCT Application No. PCT/US2023?10571.

*Primary Examiner* — Paultep Savusdiphol
(74) *Attorney, Agent, or Firm* — McCarter & English, LLP

(57) ABSTRACT

Systems and methods of authenticating a product are provided. Such systems may include an asset verifier system including an image comparator and an image data store, an asset registration station communicable with the asset verifier system, and an asset verification software application in a verification device communicable with the asset verifier system. The product to be authenticated may be a physical asset having at least one heterogeneous visual feature, or a group of visually homogenous products uniquely arranged.

21 Claims, 10 Drawing Sheets

(56) References Cited

U.S. PATENT DOCUMENTS

| | | |
|---|---|---|
| 2021/0165822 A1 | 6/2021 | Blackburn et al. |
| 2021/0201310 A1* | 7/2021 | Moss-Pultz et al. |
| 2022/0067470 A1* | 3/2022 | Van Garsse .......... C14C 11/003 |
| 2023/0169452 A1* | 6/2023 | Bay ..................... G06K 7/1413 |
| | | 705/28 |

* cited by examiner

METHOD FOR THE IDENTIFICATION, AUTHENTICATION, AND TRACKING OF PHYSICAL ASSETS

RELATED APPLICATIONS

This application is a continuation of PCT/US2023/010571 filed Jan. 11, 2023 which claims priority to U.S. Provisional Application No. 63/298,371, filed on Jan. 11, 2022, the entire contents of which are incorporated herein by reference.

The present disclosure relates to a method and system for authentication of physical assets. The physical assets possess heterogeneous visual features. More particularly, the present disclosure is directed to comparing an image and/or machine readable code associated with a physical product with earlier images and/or codes purportedly associated with the product.

There are concerns among parties regarding the authenticity of physical assets. For example, food products, such as beef, may be advertised with a specific point of origin that may be false. Similarly, leather goods are frequently counterfeited. These concerns can result in a loss of business for retailers, brand damage to producers, and potential harm to consumers.

Therefore, there exists an unmet need for the identification, authentication, and tracking of physical assets such as beef or leather. Accordingly, the present disclosure provides for a system for storing images and machine readable codes associated with physical assets, and methods of use thereof.

The present disclosure provides various embodiments of a method of authenticating a product. The method includes storing at least one image of a portion of a first product and at least one machine readable code associated with the first product in an asset verifier, the first product comprising a physical asset having at least one heterogeneous visual feature or combination of homogenous assets.

The method further includes scanning at least one of an image of a portion of a second product and a machine readable code associated with the second product. The method further includes comparing the scanned image or machine readable code to the at least one image or machine readable code in the asset verifier. The method further includes providing an indication to a user if the asset verifier contains an image or machine readable code matching the scanned image or machine readable code.

In some embodiments, storing at least one image of a portion of a first product and at least one machine readable code associated with the first product includes creating the at least one machine readable code associated with the first product and capturing the at least one image of a portion of the first product.

In some embodiments, the asset verifier is a system comprising a database and a machine vision software. In some embodiments, the asset verifier further stores at least one of authentication credentials, operational data, location data, time stamps associated with capturing the at least one image, and time stamps associated with creating the at least one machine readable code.

In some embodiments, the at least one machine readable code is affixed to the first product or affixed to packaging on or around the first product. In further embodiments, the at least one machine readable code is affixed proximate to a portion of the first product captured in the at least one image.

In some embodiments, the method further includes saving to the asset verifier at least one of location data and time stamps associated with comparing the scanned image or machine readable code. In some embodiments, the machine readable code is a Quick Response code, DataMatrix, Aztec, TrillCode, QuickMark, ShotCode, mCode, Beetagg, UPC code, or other such codes including proprietary/custom codes. In some embodiments, the scanning step is performed with a verification device.

In some embodiments, storing at least one image of a portion of a first product includes storing an image, a description of the image, or a combination thereof.

The present disclosure provides various embodiments of a system for authenticating a product. The system includes an asset verifier system which includes an image comparator and an image data store, the data store including at least one image of a portion of a first product and at least one machine readable code associated with the first product, the first product comprising a physical asset having at least one heterogeneous visual feature, or a unique combination of several visually homogenous physical assets. The system further includes an asset registration station communicable with the asset verifier system and an asset verification software application in a verification device communicable with the asset verifier system.

In some embodiments, the data store stores at least one of authentication credentials, operational data, location data, time stamps associated with capturing the at least one image, and time stamps associated with creating the at least one machine readable code.

In some embodiments, the asset verifier system includes an asset registration application programmatic interface configured to index new images of a portion of one or more products and machine readable codes associated with one or more products. In some embodiments, the asset verifier system includes an asset verification application programmatic interface configured to respond to an inquiry from the verification device to authenticate a product.

In some embodiments, the at least one machine readable code is affixed to the first product or affixed to packaging on or around the first product. In further embodiments, the at least one machine readable code is affixed proximate to a portion of the first product captured in the at least one image.

In some embodiments, the asset registration station is configured to capture at least one image of a portion of each of one or more products and read at least one machine readable code associated with the one or more products. In further embodiments, the asset registration station includes at least one camera, at least one light source, and a processor.

In some embodiments, the verification device is a smartphone, smartwatch, Augmented Reality/Virtual Reality glasses/headsets, or any device containing a camera.

In some embodiments, the asset verification software application is configured to capture an image of a portion of one or more products and read a machine readable code associated with the one or more products. In further embodiments, the asset verification software application is configured to provide an indication in response to a user query if the database contains an image or machine readable code matching the scanned image or machine readable code. In further embodiments, the asset verification software application is configured to capture time and/or location information associated with the user query.

In some embodiments, the at least one image of a portion of a first product includes an image, a description of the image, or a combination thereof.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION OF CERTAIN EXEMPLARY EMBODIMENTS

Figure 1:
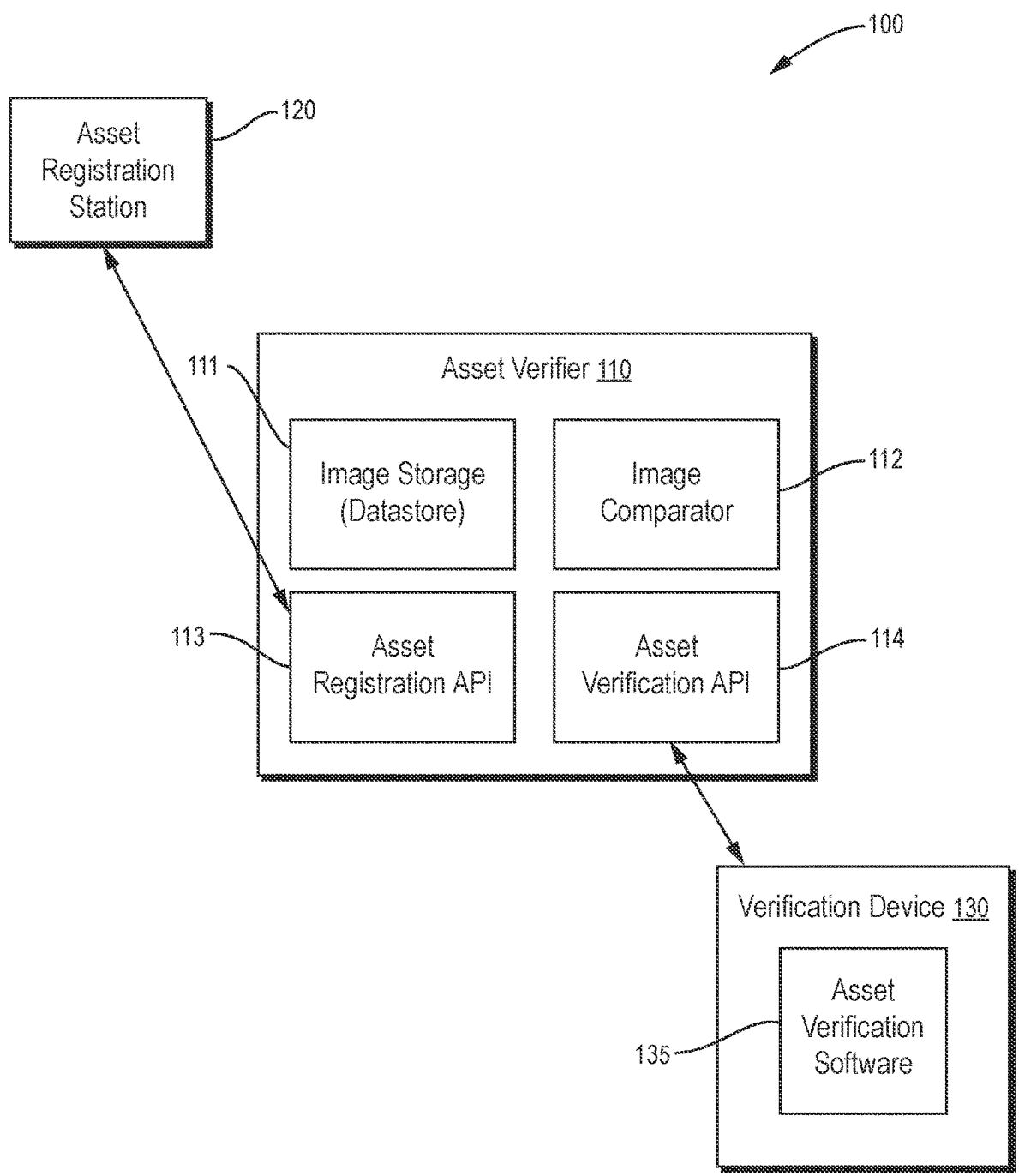
FIG. 1 is a block diagram depicting a system for identifying and authenticating a physical asset, according to some embodiments.

Reference will now be made in detail to certain exemplary embodiments according to the present disclosure, certain examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including", as well as other forms, such as "includes" and "included", is not limiting. Similarly, the use of the term "comprising," as well as other forms, such as "comprises," is also not limiting. Any range described herein will be understood to include the endpoints and all values between the endpoints.

The section headings used herein are for organizational purposes only and are not to be construed as limiting the subject matter described. All documents, or portions of documents, cited in this application, including but not limited to patents, patent applications, articles, books, and treatises, are hereby expressly incorporated by reference in their entirety for any purpose.

According to some embodiments, a system for identifying, tracking, and authenticating physical asset is provided. This invention seeks to provide a method for "smart labeling" products than have inherently heterogeneous visual attributes (e.g., meat marbling, wood grain) to enable a party to authenticate that the contents of the package match the packaging. The system keeps a record of images and machine readable codes associated with one or more physical assets. At any stage in a supply chain (warehouse, distribution, retail), a person can query the system for information regarding the materials. For example, a customer can transmit an image of the asset, and/or associated machine readable code, to the system and the system will provide information that corresponds to the image or code.

Physical assets with heterogeneous visual features, such as striations in beef or leather, marbling, or wood grain, or a unique combination of several visually homogenous physical assets, can provide a unique identifier of the asset. Products that may be tracked and authenticated with the disclosed systems and methods can include any physical asset with heterogeneous visual features such as red meat (such as beef, pork, and lamb) cuts and products, whole seafood and related processed products (such as salmon, tuna, lobster, and prawn), plant-based protein food products, leather and natural fiber assets, crafts and/or furniture built from wood-grained materials, collectibles, or combinations of visually homogenous assets such as pharmaceutical pills, amongst others. For example, the natural marbling of red meat provides a unique visual fingerprint for each red meat asset.

The system and methods described herein capture images of the unique heterogeneous visual features to track and authenticate physical assets. Fraudulent products can be identified as they do not contain the same visual features as the products first scanned into the system earlier in the supply chain.

FIG. 1 is a block diagram depicting a system 100 for identifying and authenticating a physical asset, according to some embodiments. In some embodiments, the system includes an asset verifier 110, an asset registration station 120, and a verification device 130. In some embodiments, the system 100 includes an asset verifier 110 and an asset registration station 120. The asset verifier 110 collects required information from the asset producers, via asset registration stations 120, and provides parties an authentication service via the asset verification application 135 for verification devices 130.

The asset verifier 110 may include image storage (data store 111) and an image comparator 112. The asset verifier 110 is configured to be a secure store of asset registration records for asset producers and provide parties an asset authentication service. The asset verifier 110 may be a server, or collection of servers, that provide two Application Programmatic Interfaces (APIs), one for asset registration 113 and one for asset verification 114. The asset verifier 110 may also provide two cloud-based applications: asset registration and asset verification.

The required information collected in the data store 111 by the asset verifier 110 can include an image of at least a portion of an asset, a description of such an image, or a combination thereof. In some embodiments, the portion of the asset captured in the image includes heterogeneous physical features. For example, the image may depict striations in beef or leather, marbling, or wood grain. In some embodiments, the portion of the asset captured in the image includes a unique combination of several visually homogenous physical assets. For example, the image may depict a physical configuration of pharmaceutical pills in a bottle or blister pack.

The required information collected by the asset verifier 110 in the data store 111 can include a machine readable code associated with an asset. The machine readable code may be any of a Quick Response code, DataMatrix, Aztec, TrillCode, QuickMark, ShotCode, mCode, Beetagg, UPC or proprietary/custom code. In some embodiments, the at least one machine readable code is affixed to the asset or affixed to packaging on or around the asset. The placement of the machine readable code is discussed further with regard to FIG. 4.

In some embodiments, required information collected in the data store 111 can also include authentication credentials, operational data, location data, time stamps associated with capturing the at least one image, and time stamps associated with creating the at least one machine readable code.

The authentication credentials are associated with authenticating the asset registration station 120 with the asset verifier 110, not authenticating physical assets. Authentication credentials can include a username, password, and/or one-time code, amongst others.

Operational data can include production line identifiers associated with physical assets, operator identifiers associated with the production line, product descriptors associated with the physical assets, and environmental measurements such as temperature and humidity.

Location data can include information relating to the physical location of an asset. For example, when capturing an image of at least a portion of the asset, the geographical location of the camera capturing image can be stored. As another example, the geographical location where a machine readable code on an asset is scanned can be stored.

The asset registration API 113 may be a protocol that enables a known and secure asset registration station 120 to request new assets to be registered with the asset verifier 110. The request from the asset registration station 120 may include the machine readable code and an image of at least a portion of the asset, and may also include secondary data such as authentication credentials, operational data, location data, time stamps associated with capturing the at least one image, and time stamps associated with creating the at least one machine readable code.

The asset verifier 110 is configured to store data from the asset registration station 120 in the data store 111, indexed by a Unique Product Identifier (UPI) contained within the machine readable code data. In some embodiments, the index may be augmented by secondary data such as time of day, and/or producer information.

In some embodiments, the data store 111 may be configured to automatically purge data after a set amount of time. The set time may vary depending on the type of asset.

The asset verification API 114 is a protocol that enables users of a verification device 130 to request the verification of an asset's authenticity. The request from the verification device 130 includes a machine readable code and an image of an asset, and may optionally include secondary data as described above. The asset verifier 120 uses the machine readable code data to quickly and efficiently retrieve the registered image associated with the asset. The registered image and the image of the verification request are then compared by the image comparator 112. Other checks based on secondary data (such as location information, or time-stamps) may also be used. Depending on the output of these checks, the asset verifier 120 may send either a positive, negative or indeterminable authentication message to the asset verification software 135 on the verification device 130. Any additional data associated with the asset, e.g., a recall notice, may be also sent to the asset verification software 135. In some embodiments, the additional data is displayed with the authentication message.

The data store 111 may be a server-based application that keeps a current record of the assets registered with the system 100, indexed by each asset's machine readable code. The data store 111 keeps records of the registered asset's machine readable code, the associated asset image, and any subsequent producer data. Producers can add records to the data store 111 via the asset registration station 120, through the asset registration API 113.

In some embodiments, the data store 111 may utilize one or more blockchain ledger(s) to store asset data. The blockchain may provide a transparent record of an asset as the asset moves from producer to retail in the supply chain.

The image comparator 112 may be a server-based application which compares the records in the data store 111 to the records provided by the verification request from the verification device 130. In some embodiments, the records include images and machine readable codes associated with assets. The image comparator 112 is configured to conduct a machine-vision based image comparison of a stored image and an image provided with the verification request. In some embodiments, the image comparator 112 may conduct additional validity checks based on subsequent information, such as the parties' location and time/date of the verification request.

The asset registration station 120 is configured to register one or more assets with the asset verifier 110. Registration involves reading the machine readable code and taking a calibrated image of at least a portion of the assets. The machine readable code data and the image are then sent to the asset verifier 110, along with any other required information such as authentication credentials, operational data, and time stamps.

In some embodiments, the asset registration station 120 is designed to be highly automated. An automated asset registration station 120 provides for high unit throughput with minimal labor. For example, the asset registration station 120 may automate the process of scanning a machine readable code and capturing an image of at least a portion of an asset, but require user interaction to start the process and/or approve of captured images. In some embodiments, the asset registration station 120 may include materials handling equipment and controls (e.g. conveyor belts, actuators) for higher degrees of automation.

The asset registration station 120 may include hardware and software deployed at a producer's packaging site(s). Each station 120 may include a machine vision subsystem (for example—camera, lenses, focusing hardware, lighting), materials handling equipment (for example—conveyor belts, sorters), a processor running dedicated software, and user interfaces (for example—touch screens, status traffic lights, audible announcers). The asset registration station 120 may be communicable to the asset verifier 110 via the internet or have dedicated data lines to the asset verifier 110.

The asset registration station 120 may be configured to revoke the registration of assets. For example, if an asset is determined to be counterfeit, a user may manually revoke the registration of the counterfeit asset. Similarly, a user may manually revoke the registration of an asset if the asset is destroyed after registration with the system 100.

In some embodiments, the asset registration station 120 may automatically make a determination that an asset is counterfeit. For example, if a captured image reveals homogenous features indicative of counterfeit leather, the asset registration station 120, or asset verifier 110, may remove the asset from the system and provide a notification to a user of the system 100.

In some embodiments, the asset registration station 120 is configured to augment data of registered assets relevant to subsequently received information. For example, the asset registration station 120 may augment data in view of received recall notices or promotional information. If the asset registration station 120 loses connectivity to the asset verifier 110, the asset registration station 120 may be configured to cache asset data until connectivity is restored.

The verification device 130 may include asset verification software 135. The role of the asset verification software 135 is to enable a to authenticate assets in real time. The asset verification software 135 may be a mobile software application configured to use the camera, GPS, clock/calendar, and/or internet connectivity sub-systems of a smartphone, as well as a touchscreen for user interactions. For example, a user may point a smartphone camera at the asset's label to prompt an authentication query with the asset verification software 135.

In some embodiments, the asset verification software 135 may also record user identifying information such as smartphone make/model, serial number, and the like. Recorded user data may be utilized to improve the performance of the system 100. For example, patches may be created for the asset verification software 135 based on the performance of the software on specific smartphone make/models.

If the verification device 130 loses connectivity to the other elements of the system 100, the asset verification software 135 is configured to provide a message to the user that verification is not currently possible due to loss of connectivity.

Figure 2:
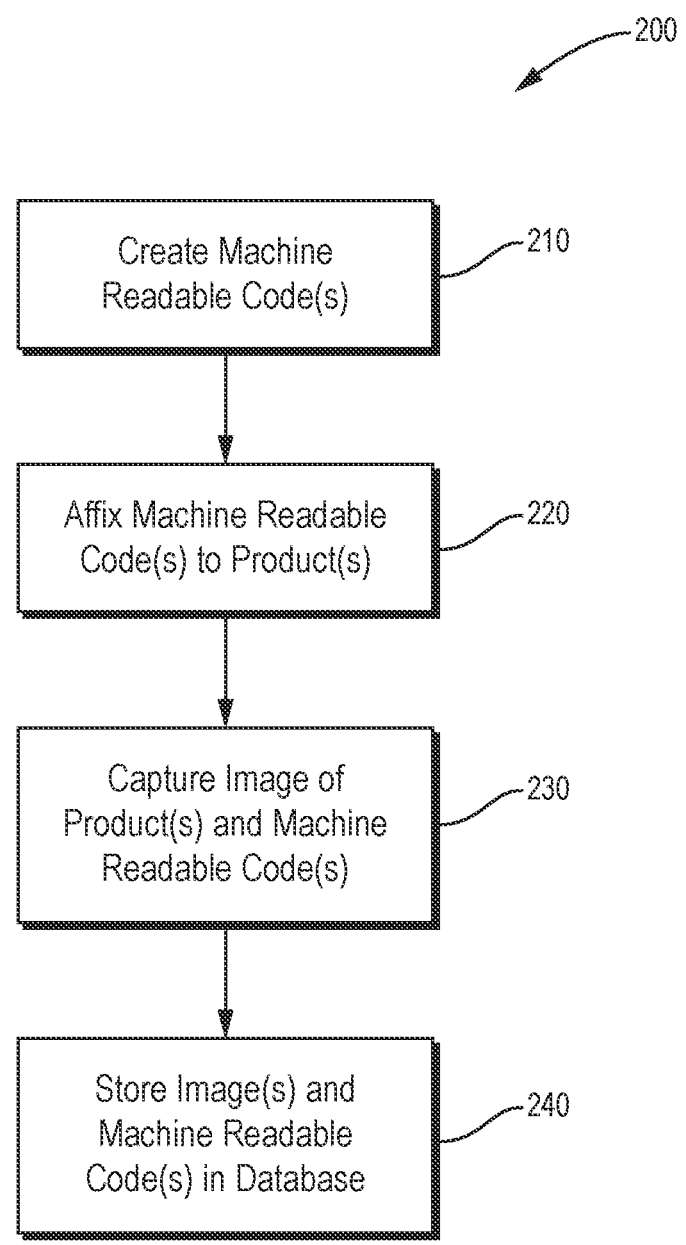
FIG. 2 is a flowchart depicting a method of storing an image and/or machine readable code associated with a physical asset, according to some embodiments.

FIG. 2 is a flowchart depicting a method 200 of storing an image and/or machine readable code associated with a physical asset having heterogeneous features or a group of physical assets having homogenous features, according to some embodiments. The method begins in Step 210 by creating a machine readable code associated with the physical asset or group of assets. The machine readable code may be any of a Quick Response code, DataMatrix, Aztec, TrillCode, QuickMark, ShotCode, mCode, Beetagg, UPC or proprietary/custom code. In some embodiments, the code is printed as a physical label.

In Step 220, the machine readable code is affixed to the physical asset or group of assets. In some embodiments, the code is applied to the asset by the producer at the time of packaging. In some embodiments, the code is affixed in conjunction with an underlying asset window (UAW).

Figure 4A:
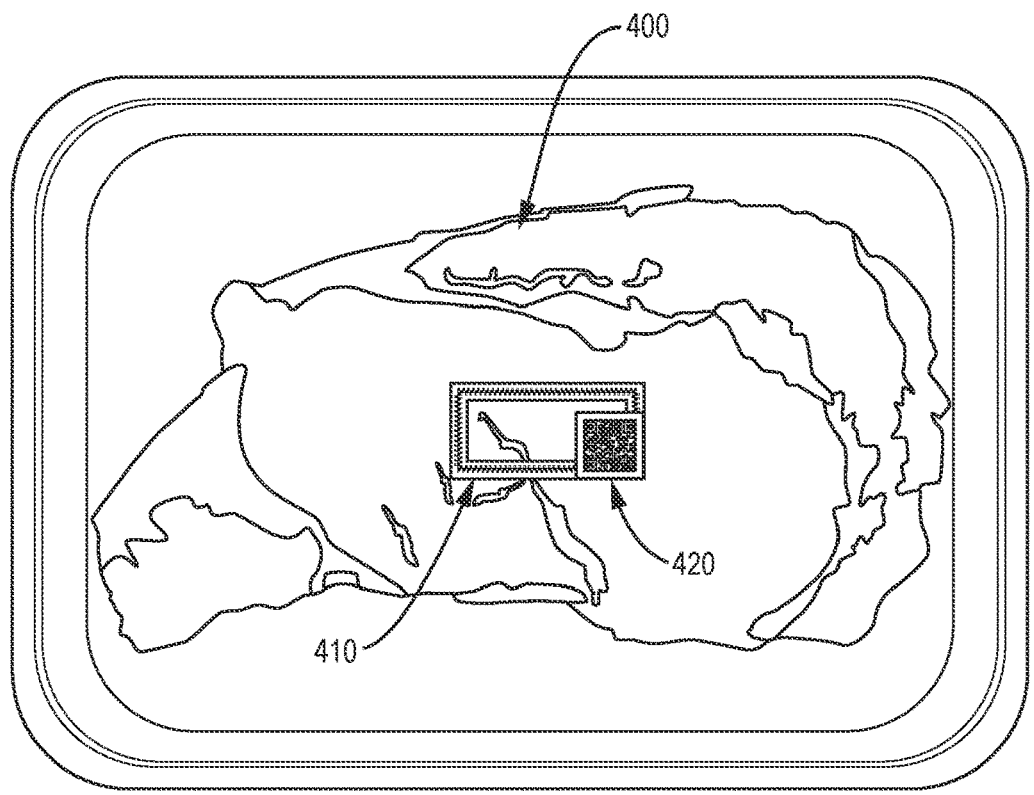
FIG. 4A is an image of an exemplary machine readable code and underlying asset window applied to a physical asset, according to some embodiments.

FIG. 4A is an image of an exemplary machine readable code 420 and UAW 410 applied to a physical asset 400, according to some embodiments. A physical label, such as a printed sticker, including the code 420 may be added to a packaging on or around the physical asset 400. The label may be imprinted directly onto the asset 400, for example as a laser etching, depending on the underlying asset. The label can be produced dynamically (at the time of packaging), or statically (batch printed ahead of time).

The UAW 410 may be used by a user to verify the authenticity of the asset 400. The UAW 410 may or may not, be designated by a visible border augmenting the machine readable code 420. The visible border may illustrate the area of the underlying asset being used to inspect the asset. The visual border may be functional, decorative for marketing purposes, or include a trademark or logo.

Figure 4B:
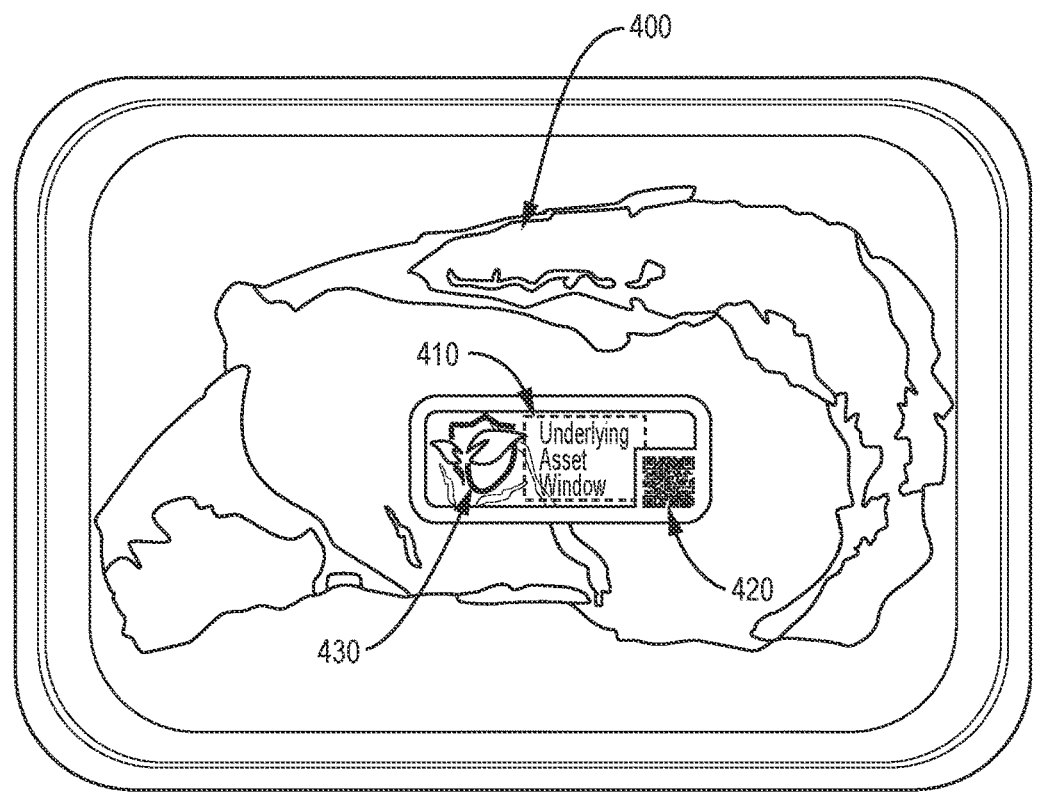
FIG. 4B is an image of an exemplary machine readable code, logo, and underlying asset window applied to a physical asset, according to some embodiments.

FIG. 4B is an image of an exemplary machine readable code 420, logo 430, and underlying asset window 410 applied to a physical asset, according to some embodiments. As can be seen in FIG. 4B, the underlying asset window 410, machine readable code 420, and logo 430 may all be located within a visible border.

Figure 5:
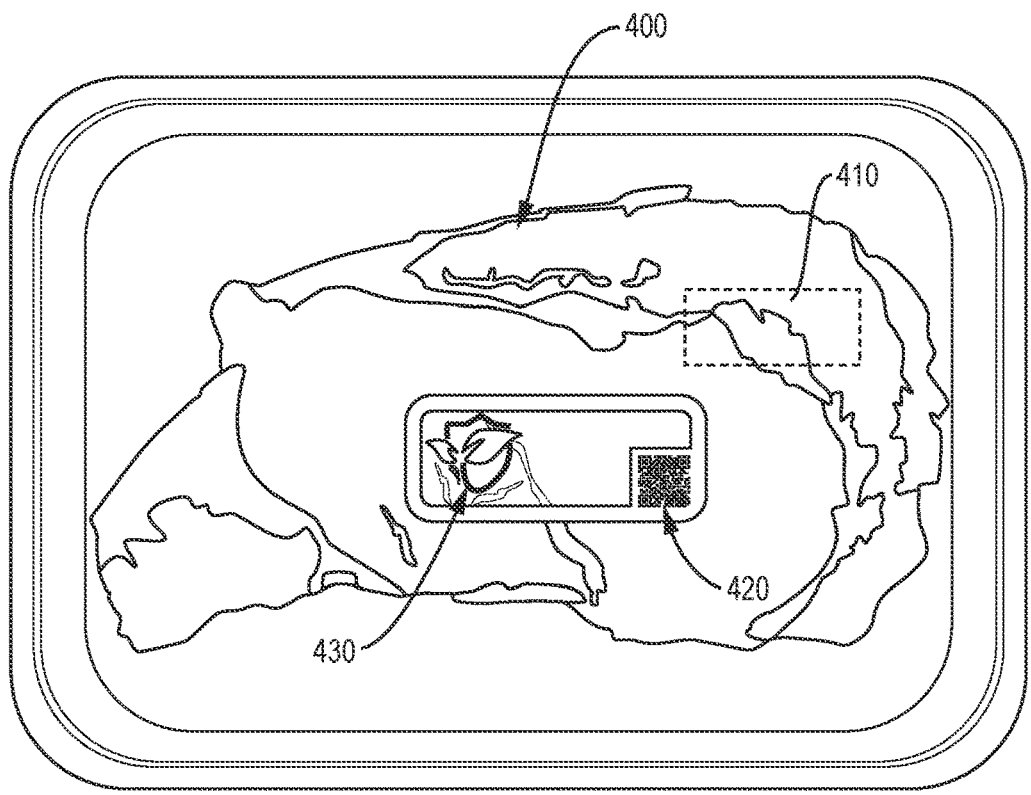
FIG. 5 is an image of an exemplary machine readable code, logo, and a borderless underlying asset window applied to a physical asset, according to some embodiments.

FIG. 5 is an image of an exemplary machine readable code 420, logo 430, and a borderless UAW 410 applied to a physical asset 400, according to some embodiments. The grey dashed box shows the location of the UAW 410 which is not visually indicated by any physical markings on the packaging. In embodiments where a visual border does not designate the UAW 410, the visual border may illustrate an area of the underlying asset not used to inspect the underlying asset. The actual UAW 410 may not marked for security purposes. For example, the depicted label of FIG. 5 insinuates that the meat will be inspected in the yellow border area, whereas the actual inspection will be based on the invisible grey border area. The UAW 410 does not need to be a physical component of the physical label. It can be "virtual", with its location resolved relative to the code 420.

Figure 6:
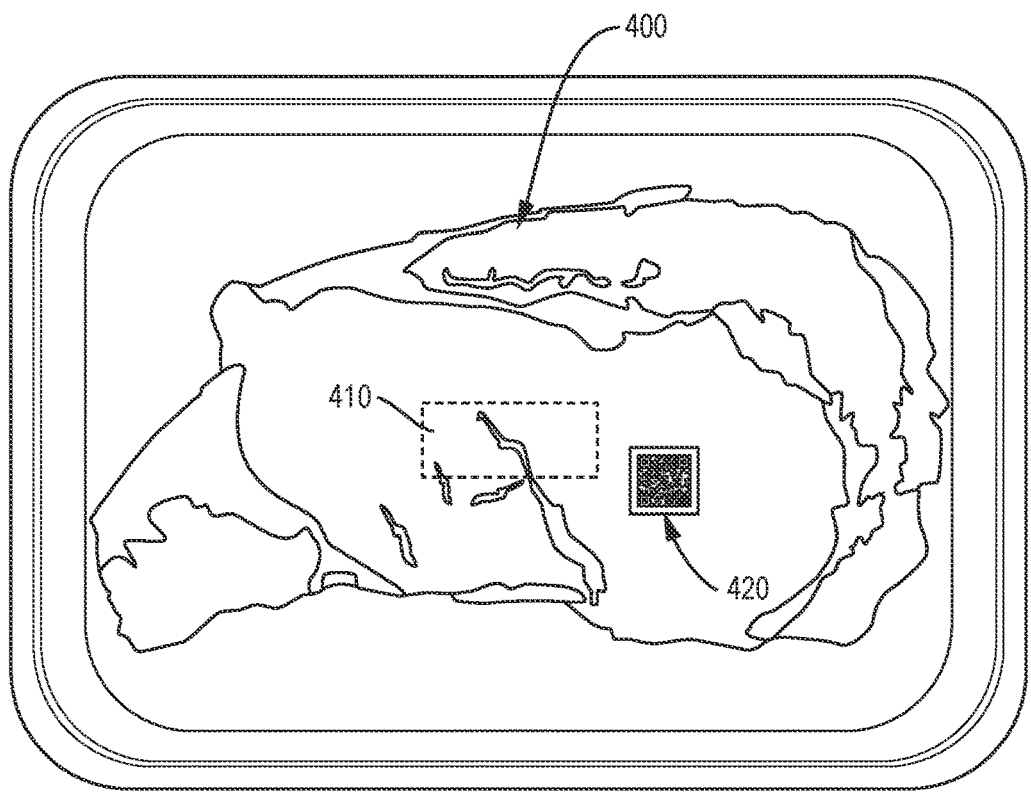
FIG. 6 is an image of an exemplary machine readable code and a borderless underlying asset window applied to a physical asset, according to some embodiments.

FIG. 6 is an image of an exemplary machine readable code 420 and a borderless UAW 410 applied to a physical asset 400, according to some embodiments. The grey dashed box shows the location of the UAW 410 which is not visually indicated by any physical markings on the packaging. This instantiation can yield a simpler and lower-cost labelling solution, removing the need for a transparent window or visible border within the physical label or packaging.

The machine readable code 420 serves several functions. First, it enables unique identification of the underlying asset 400 through a unique asset identifier. Second, it provides a known visual marking which can be used to locate the UAW 410. Third, it provides a mechanism for the end user to easily acquire a mobile application for their smartphone to access the Asset Verifier 110.

In Step 230, an image of a portion of the physical asset or group of assets is taken. In some embodiments, the image further includes the machine readable code. In some embodiments, a digital image of the product around the area of the UAW may be taken at the time of packaging by the producer of the assets. The image includes heterogeneous physical features of the asset or a heterogeneous arrangement within a group of homogenous assets.

In Step 240, the image is stored in the database. In some embodiments, the image stored in the database may be indexed to include descriptors of the physical asset, as described above. In some embodiments, descriptors of the image are stored in the database. In some embodiments, only the descriptors, and not the image itself, are stored in the database.

Figure 3:
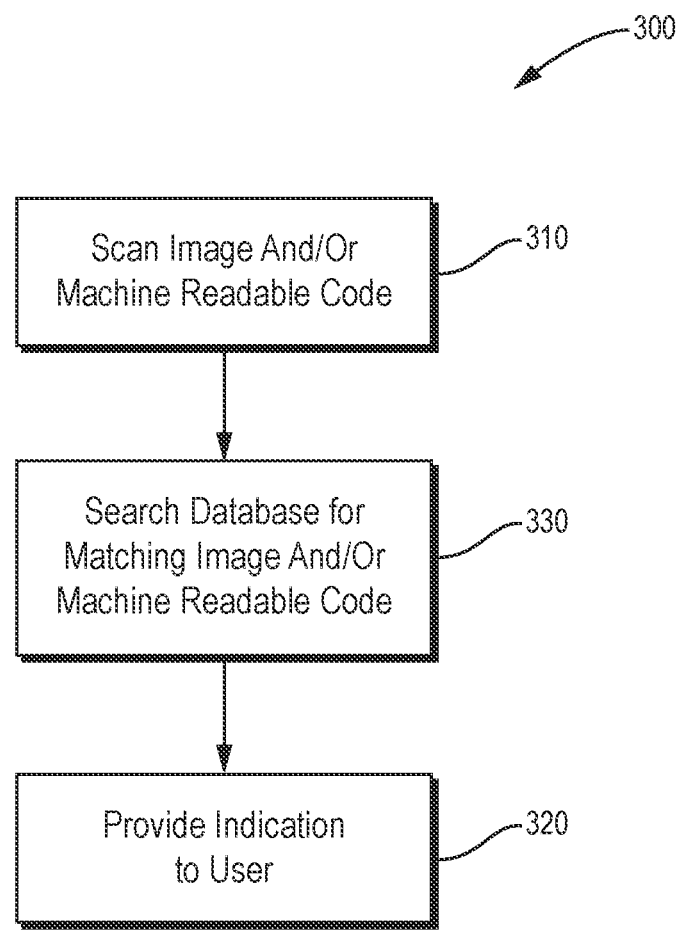
FIG. 3 is a flowchart depicting a method of identifying and authenticating a physical asset, according to some embodiments.

FIG. 3 is a flowchart depicting method 300 of identifying and authenticating a physical asset or group of assets, according to some embodiments. Prior to beginning method 300, a database may be created, for example the asset verifier discussed above. The database may be populated with images of physical assets and/or descriptors of images of physical assets. The images may depict a portion of the physical assets possessing heterogeneous physical features or a heterogeneous arrangement within a group of homogenous assets. The database may further be populated with machine readable codes associated with the physical assets. Population of the database is explained in further detail with regards to the flowchart of FIG. 2.

In some embodiments, the images and machine readable codes stored in the database may be indexed by a Unique Product Identifier. The database may include additional data such as the type of physical assets (food, leather, etc.), the manufacturer of the assets, the age of the assets, the country of origin of the assets (or a specific region within the country of origin), or any other useful descriptor of the assets associated with the images or machine readable codes.

In Step 210, a user scans an image of at least a portion of a physical asset or group of physical assets, and/or scans a machine readable code associated with the physical asset. For example, a user may use a smartphone to scan a machine readable code on a packaging of a piece of beef in a grocery store. As another example, a retailer may take an image of a leather handbag received from a warehouse.

An application on a smartphone may provide on-screen prompts for alignment of the asset's label with the phone's camera. Once the camera and the asset's label are sufficiently aligned, an auto-shutter feature of the camera may automatically takes an image of the code and underlying asset window (UAW). The code data and the UAW image, along with time and location information, may be sent to the database for verification in Step 220. The UAW is described in more detail above with regards to FIG. 4.

In Step 220, the method includes searching the database for an image and/or code matching the image or machine readable code scanned by the user in Step 210. In some embodiments, the database is searched for an image exactly similar to the scanned image. In some embodiments, the database is searched for an image partially similar to the scanned image, for example 80%, 85%, 90%, 99%, 99.9% similar or any percentage between. In some embodiments, the database is searched for a descriptor matching a description of the image scanned by the user.

The method continues in Step 230, providing an authentication indication to the user of Step 220. The indication may include whether the scanned image or machine readable code has a matching counterpart in the database. If a match is found, the indication may include descriptors associated with the physical asset or group of physical assets, such as the manufacturer of the asset, the age of the asset, or the country of origin of the asset (or a specific region within the country of origin). If a match is not found, the indication may include a message that the source of the asset could not be verified. If there is uncertainty to a potential match, the indication may include a message that the source of the asset is uncertain.

In some embodiments, the indication may include a message that authentication of the asset is not currently possible, for example due to loss of connectivity to the database. In some embodiments, Steps 220 and/or 230 may be repeated when connectivity with the database is reestablished.

The methods discussed above may be employed with red meat products such as beef meat as depicted in FIGS. 4A, 4B, 5, and 6. FIGS. 7-14 depict other physical assets that may be employed with the discussed methods.

Figure 7:
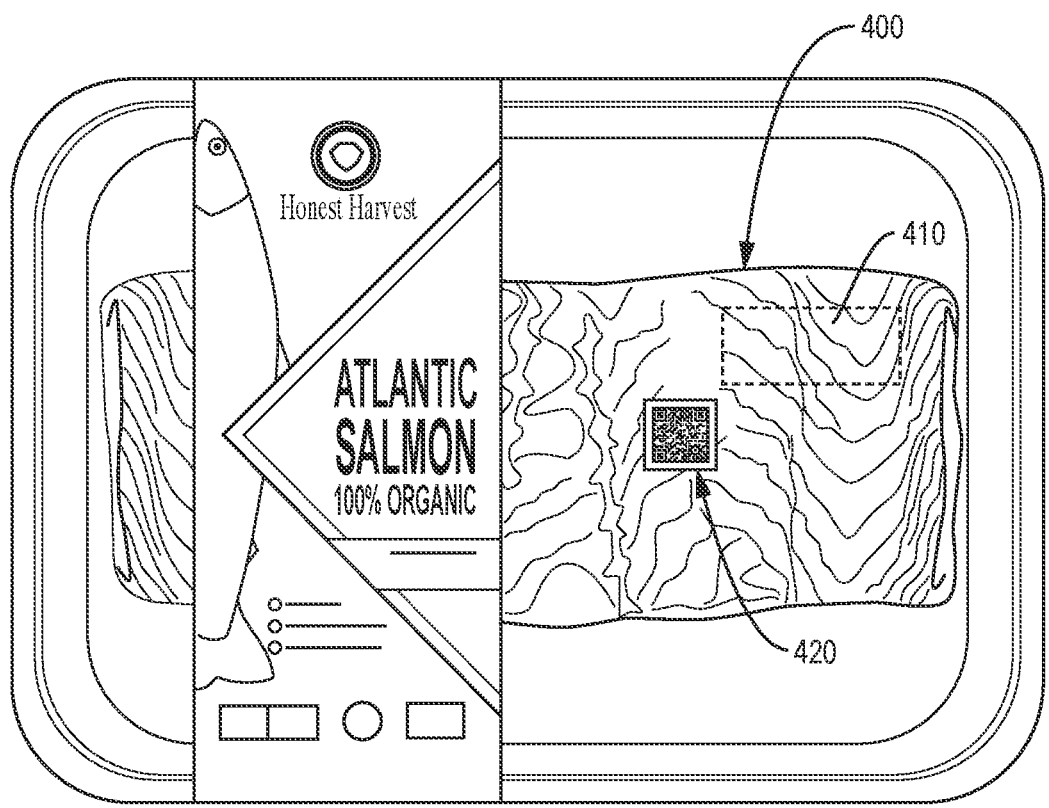
FIG. 7 is an image of an exemplary machine readable code applied to a physical seafood asset, according to some embodiments.

FIG. 7 is an image of an exemplary machine readable code 420 applied to a physical seafood asset 400, according to some embodiments. The natural variation within the coloration of fish tissue, for species such as salmon, tuna and many others, provides a unique visual fingerprint for each asset. The machine readable code 420 may be affixed in conjunction with an UAW 410 identifying a specific area of coloration.

Figure 8A:
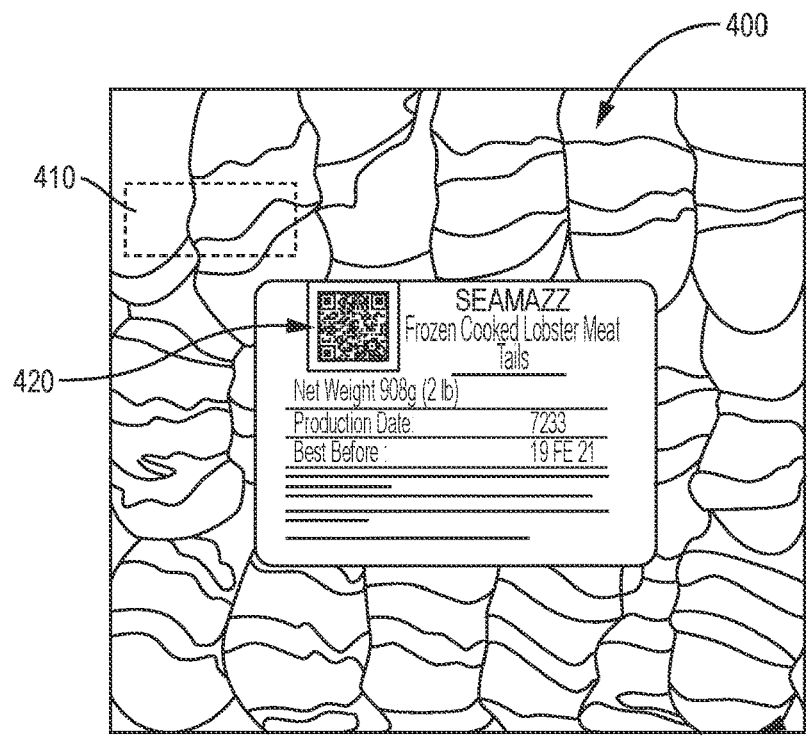
FIGS. 8A and 8B are images of an exemplary machine readable code applied to a physical shellfish asset, according to some embodiments.
Figure 8B:
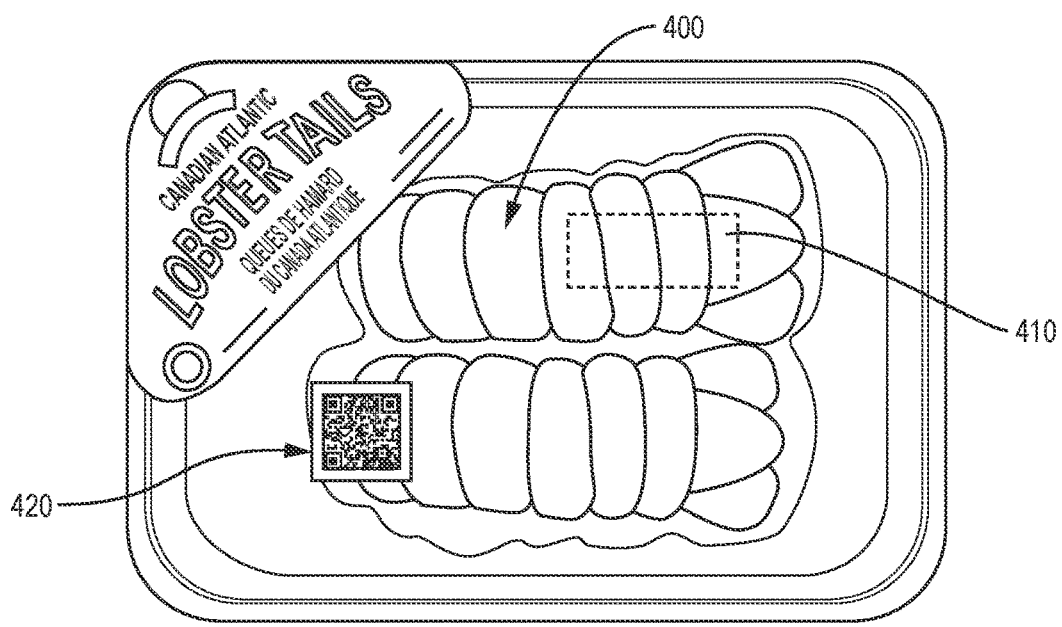

FIGS. 8A and 8B are images of an exemplary machine readable code 420 applied to a physical shellfish asset 400, according to some embodiments. Shellfish, such as lobster and prawns, produce visually heterogeneous features. The visual variation can be within the pigmentation of the cooked meat, or the unprocessed shell. This can be either at the level of a single item (e.g. a vacuum-packed half lobster as depicted in FIG. 8B) or the level of a group of items, such as a pack of prawns as depicted in FIG. 8A. The machine readable code 420 may be affixed in conjunction with an UAW 410 identifying a specific area of pigmentation.

The methods disclosed herein can also be used to authenticate homogenous products, such as pharmaceuticals pills when the pills are bundled in suitable packaging. The collective arrangement within bundling packages such as bottles, or blister packs, can produce heterogeneous images, even though each individual pill may not provide any necessary visual diversity.

Figure 9:
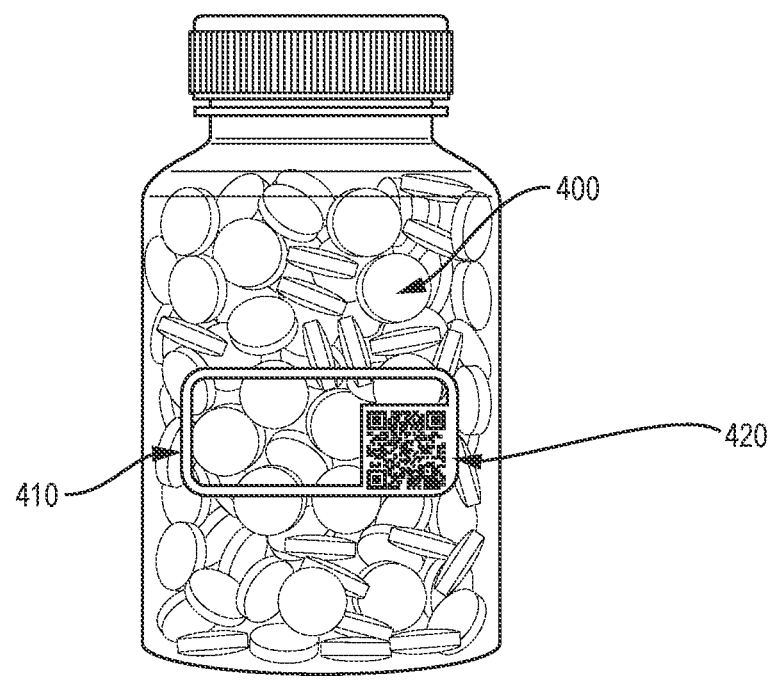
FIG. 9 is an image of an exemplary machine readable code applied to a homogenous unmarked pharmaceutical asset, according to some embodiments.

FIG. 9 is an image of an exemplary machine readable code 420 applied to a homogenous unmarked pharmaceutical asset 400, according to some embodiments. Unmarked, identical pills may be physically constrained at the point of packing within a container that is at least partially transparent, with the transparent portion of the container operating as a UAW 410 to the container's contents. A heterogeneous image is produced by the random arrangement of homogeneous products within the container. The packing within the container, such as bulk cotton, prevents the pills from shifting in transit to maintain the same heterogeneous image.

Figure 10:
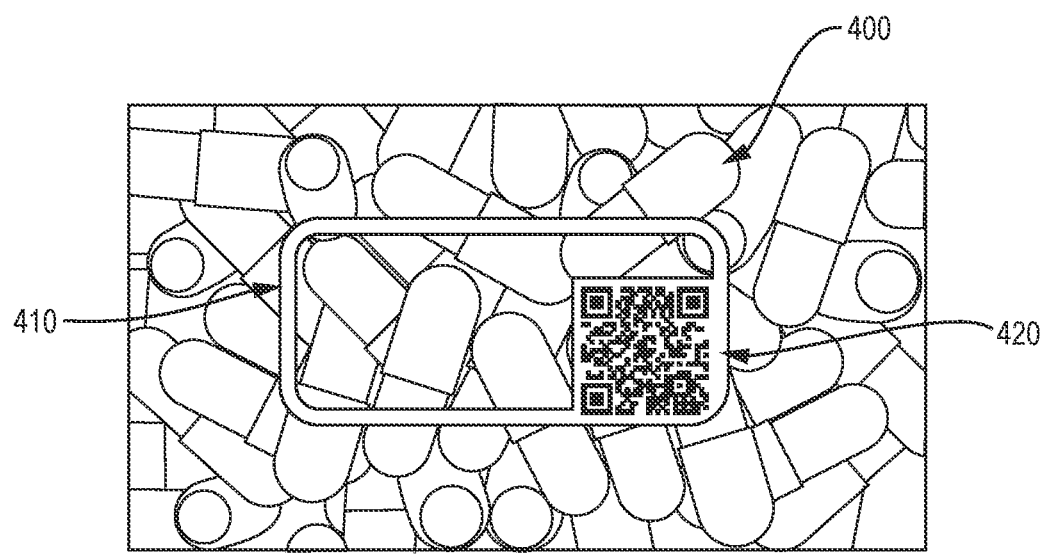
FIG. 10 is an image of an exemplary machine readable code applied to a homogenous marked pharmaceutical asset, according to some embodiments.

FIG. 10 is an image of an exemplary machine readable code 420 applied to a homogenous marked pharmaceutical asset 400, according to some embodiments. In some embodiments, the pills may be marked with regular markings or irregular patterns to add visual diversity, increasing the heterogeneity an image of the pills. Similar to FIG. 9, the pills are similarly physically constrained at the point of packing, with the transparent portion of the container operating as a UAW 410 to the container's contents.

Figure 11:
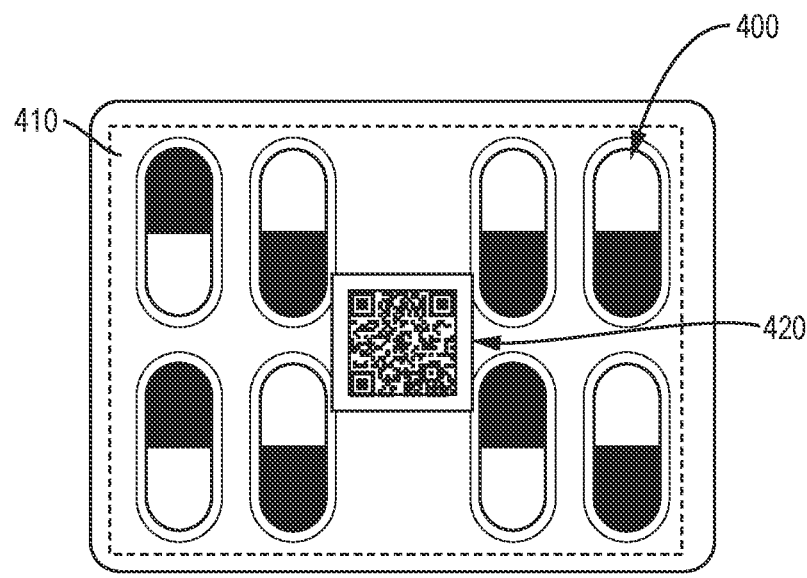
FIG. 11 is an image of an exemplary machine readable code applied to a homogenous pharmaceutical asset with a randomized orientation, according to some embodiments.

FIG. 11 is an image of an exemplary machine readable code 420 applied to a homogenous pharmaceutical asset 400 with a randomized orientation, according to some embodiments. In some embodiments, pills are provided in a blister pack. A heterogeneous image of the pills may be realised by the random orientation of homogeneous pills within the pack. Machine readable code 420 may be situated on an area of the packaging proximate to one or more pills. The machine readable code 420 may be affixed in conjunction with an UAW 410 identifying one or more of the pills.

Figure 12:
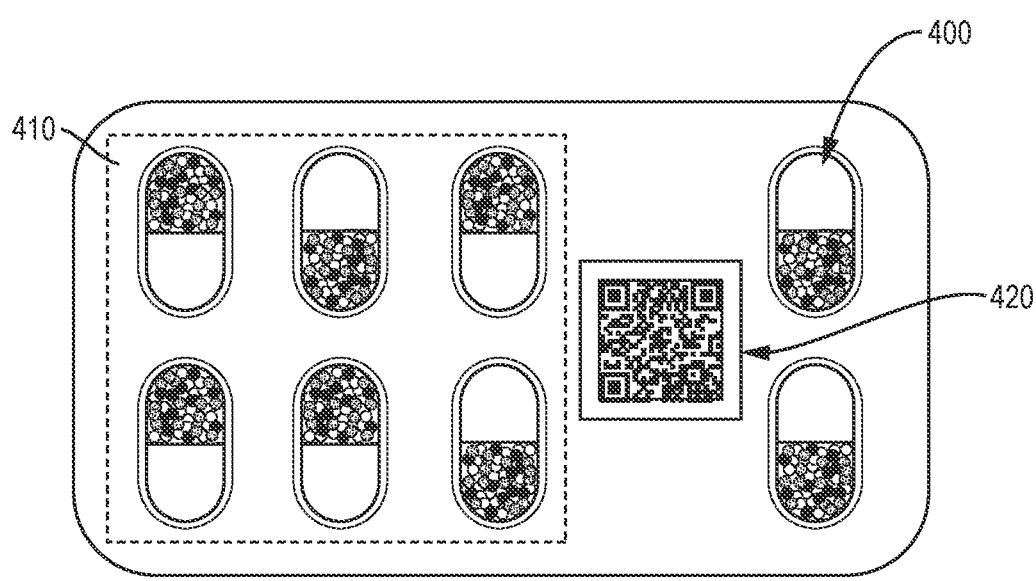
FIG. 12 is an image of an exemplary machine readable code applied to a heterogeneous pharmaceutical asset with a randomized orientation, according to some embodiments.

FIG. 12 is an image of an exemplary machine readable code 420 applied to a heterogeneous pharmaceutical asset 400 with a randomized orientation, according to some embodiments. In embodiments with heterogeneous pills, the heterogeneous image is realised by the random orientation of the pills and the heterogeneous appearance of each pill. Machine readable code 420 may be situated on an area of the packaging between one or more pills. The machine readable code 420 may be affixed in conjunction with an UAW 410 identifying one or more of the pills.

Figure 13:
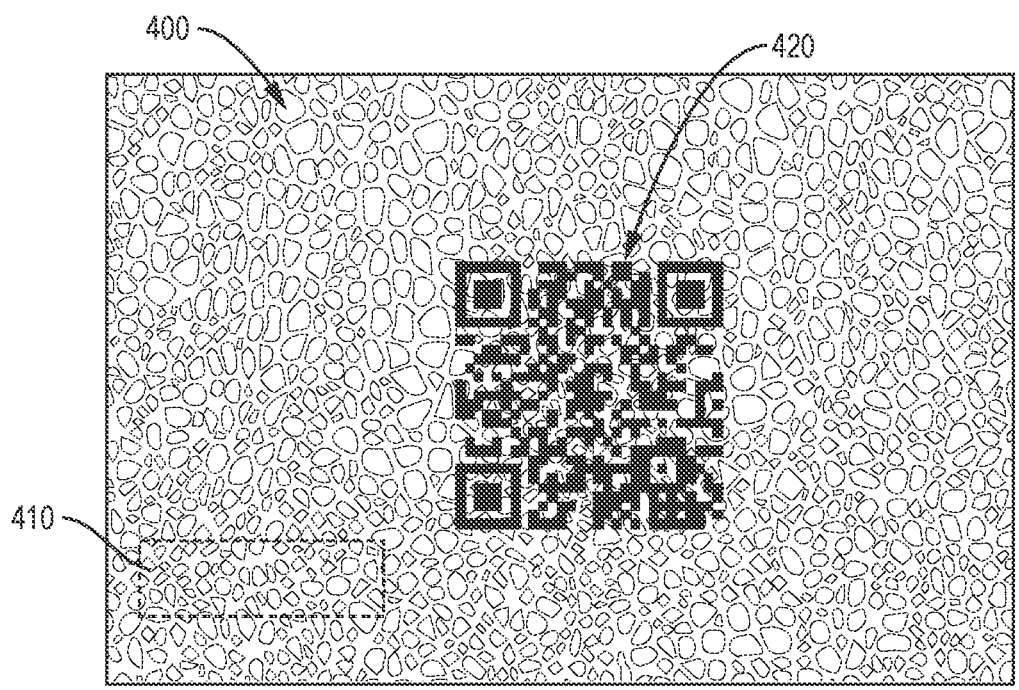
FIG. 13 is an image of an exemplary etched machine readable code applied to a leather asset, according to some embodiments.

The grain of leather and wood may also be used to provide unique visual images to authenticate leather or wood items. A machine readable code 420 can be added to a leather or wood item in a temporary way, such as with a sticker, or in a permanent way, such as by chemical or laser etching the machine readable code 420 to the underlying asset. FIG. 13 is an image of an exemplary etched machine readable code applied to a leather asset 400, according to some embodiments. The leather asset 400 may be, for example, a handbag, wallet, or a leather clothing item. The machine readable code 420 may be affixed in conjunction with an UAW 410 identifying a specific area of grain or striation.

Figure 14:
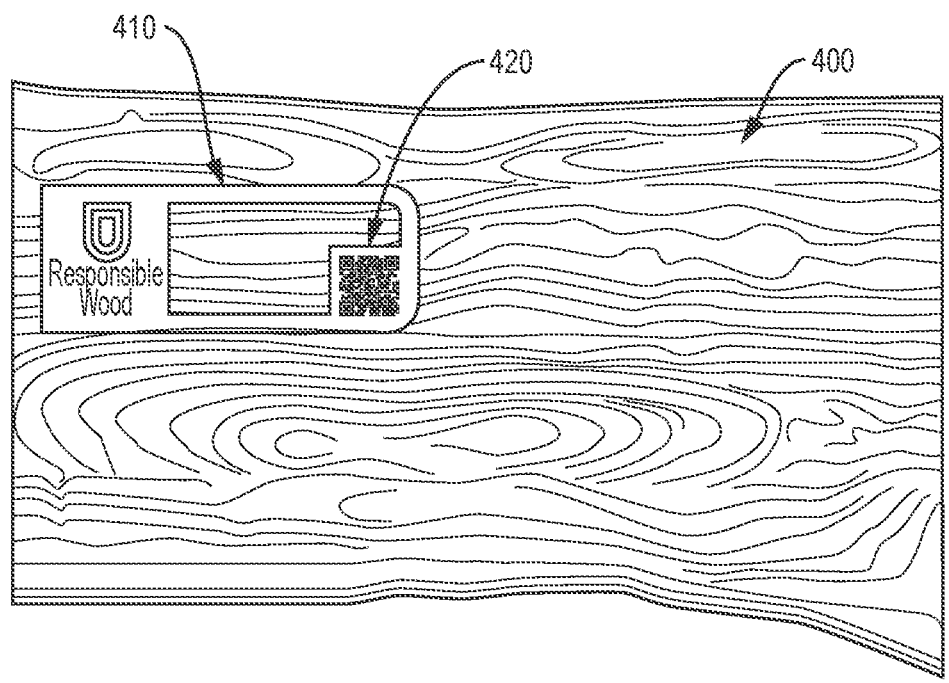
FIG. 14 is an image of an exemplary machine readable code applied to a wood-grained asset, according to some embodiments.

FIG. 14 is an image of an exemplary machine readable code 420 applied to a wood asset 400, according to some embodiments. The natural wood grain provides the heterogeneous images used to identify either finished wooden items or wood materials. The wood asset 400 may be, for example, raw building material, a cutting board, a decorative item, shelving, or furniture. The machine readable code 420 may be affixed in conjunction with an UAW 410 identifying a specific area of wood grain.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

What is claimed is:

1. A method of authenticating a product, comprising:
   storing at least one image of at least one heterogeneous visual feature of a first animal or plant based protein having the at least one heterogeneous visual feature or at least one heterogeneous visual feature of a first group of animal or plant based proteins having homogeneous visual features, and at least one machine readable code associated with the first protein or first group of proteins in an asset verifier, the at least one machine readable code located proximate to the at least one heterogeneous feature;
   scanning at least one of an image of at least one heterogeneous visual feature of a second animal or plant based protein having the at least one heterogeneous visual feature or a second group of animal or plant based proteins having the heterogeneous visual features and a machine readable code associated with the second protein or group of proteins;
   comparing the scanned image or the machine readable code to the at least one image or the at least one machine readable code in the asset verifier; and
   providing an indication to a user if the asset verifier contains an image or machine readable code matching the scanned image or the machine readable code.

2. The method of claim 1, wherein the storing step comprises:
   creating the at least one machine readable code associated with the first protein or first group of proteins; and
   capturing the at least one image of at least one heterogeneous visual feature of the first protein or first group of proteins.

3. The method of claim 1, wherein the asset verifier is a system comprising:
   a database; and
   a machine vision software.

4. The method of claim 1, wherein the asset verifier further stores at least one of authentication credentials, operational data, location data, time stamps associated with capturing the at least one image, and time stamps associated with creating the at least one machine readable code.

5. The method of claim 1, wherein the at least one machine readable code is affixed to the first protein or first group of proteins or affixed to packaging on or around the first protein or first group of proteins.

6. The method of claim 1, further comprising storing to the asset verifier at least one of location data and time stamps associated with comparing the scanned image or machine readable code.

7. The method of claim 1, wherein the machine readable code is a Quick Response code, DataMatrix, Aztec, TrillCode, QuickMark, ShotCode, mCode, Beetagg, UPC or a custom/proprietary code.

8. The method of claim 1, wherein the scanning step is performed with a verification device.

9. The method of claim 1, wherein storing at least one image of at least one heterogeneous visual feature of a first protein or first group of proteins comprises storing an image, a description of the image, or a combination thereof.

10. A system for authenticating a product, comprising:
    an asset verifier system comprising an image comparator and an image data store, the data store storing at least one image of at least one heterogeneous visual feature of a first animal or plant based protein having the at least one heterogeneous visual feature or at least one heterogeneous visual feature of a first group of food products comprising an animal or plant based protein having homogeneous visual features, and at least one machine readable code associated with the first protein or first group of proteins, the at least one machine readable code located proximate to the at least one heterogeneous feature;
    an asset registration station communicable with the asset verifier system; and
    an asset verification software application in a verification device communicable with the asset verifier system.

11. The system of claim 10, wherein the data store stores at least one of authentication credentials, operational data, location data, time stamps associated with capturing the at least one image, and time stamps associated with creating the at least one machine readable code.

12. The system of claim 10, wherein the asset verifier system includes an asset registration application programmatic interface configured to index new images of at least one heterogeneous visual feature of one or more proteins or first group of proteins, and machine readable codes associated with one or more proteins or first group of proteins.

13. The system of claim 10, wherein the asset verifier system includes an asset verification application programmatic interface configured to respond to an inquiry from the verification device to authenticate a protein or first group of proteins.

14. The system of claim 10, wherein the at least one machine readable code is affixed to the first protein or first group of proteins or affixed to packaging on or around the first protein or first group of proteins.

15. The system of claim 10, wherein the asset registration station is configured to capture at least one image of at least one heterogeneous visual feature of each of one or more proteins or first group of proteins and read at least one machine readable code associated with the one or more proteins or first group of proteins.

16. The system of claim 15, wherein the asset registration station comprises:
   at least one camera;
   at least one light source; and
   a processor.

17. The system of claim 10, wherein the verification device is a smartphone, smartwatch, Augmented Reality/Virtual Reality glasses/headsets, or any device containing a camera.

18. The system of claim 10, wherein the asset verification software application is configured to capture an image of at least one heterogeneous visual feature of one or more proteins or first group of proteins and read a machine readable code associated with the one or more proteins or first group of proteins.

19. The system of claim 18, wherein the asset verification software application is configured to indicate a response to a user query if the database contains an image or machine readable code matching the scanned image or machine readable code.

20. The system of claim 19, wherein the asset verification software application is configured to capture time information, location information, a device identifier and/or other data associated with the user query.

21. The system of claim 10, wherein the at least one image of at least one heterogeneous visual feature of a first protein or first group of proteins comprises an image, a description of the image, or a combination thereof.

* * * * *